United States Patent [19]
Kimberlin, Jr. et al.

[11] 3,764,520
[45] Oct. 9, 1973

[54] HYDROCARBON CONVERSION SYSTEM

[75] Inventors: **Charles Newton Kimberlin, Jr.;
Alexis Voorhies, Jr.,** both of
Baton Rouge, La.

[73] Assignee: **Esso Research and Engineering
Company,** Linden, N.J.

[22] Filed: Nov. 30, 1965

[21] Appl. No.: 510,688

Related U.S. Application Data
[63] Continuation-in-part of Ser. No. 194,024, May 11, 1962, Pat. No. 3,238,123.

[52] U.S. Cl.............. 208/111, 208/89, 208/120, 260/683.65
[51] Int. Cl........................ C10g 13/04, C10g 11/04
[58] Field of Search................ 208/110, 111, 120; 252/455

[56]        References Cited
         UNITED STATES PATENTS
3,136,713   6/1964   Miale et al.......................... 208/113
3,130,007   4/1964   Breck................................... 23/113

FOREIGN PATENTS OR APPLICATIONS
1,363,673   5/1964   France
63/5248     8/1964   South Africa

OTHER PUBLICATIONS

Barrer et al. "Helvetica Chemica Acta," XXXIX, Fascicnias II, No. 61, p. 518–530, 1956.

*Primary Examiner*—Delbert E. Gantz
*Attorney*—Whelan, Chasan, Litton, Marx and Wright and John J. Schlager

[57]            ABSTRACT

This application is concerned with processes for converting hydrocarbons in contact with a catalyst mixture comprising two different alumino silicate zeolites having different ranges of pore size, i.e. 6–15 Angstroms and less than 6 Angstroms. Conversions such as hydrocracking, hydroisomerization and hydrogenation are disclosed employing additional catalytic components such as catalytic metals and inorganic oxide supports.

2 Claims, No Drawings

HYDROCARBON CONVERSION SYSTEM

This application is a continuation-in-part of copending application, Ser. No. 194,024, filed May 11, 1962 and now U.S. Pat. No. 3,238,123.

The present invention deals with improved means for upgrading hydrocarbon oil streams. More particularly, it deals with a process wherein selected portions of a hydrocarbon feed stream are adsorbed in the presence of a mixture of hydrocarbon conversion catalyst and crystalline alumino-silicate zeolites and then subjected to conversion conditions so as to upgrade adsorbed hydrocarbon constituents. Still more particularly, it deals with a process wherein a hydrocarbon feed or a selected portion thereof is upgraded by contact with a mixture of two or more types of crystalline aluminosilicate zeolites at conversion conditions.

It is, of course, well known in the art to improve the quality of various hydrocarbon oils by treating them with catalysts under varying conditions of conversion to effect such reactions as cracking, hydrocracking, hydrofining, aromatization, etc. Moreover, the use of crystalline alumino-silicate zeolites having effective pore diameters which may range from 4 to 15 Angstroms as adsorbents for hydrocarbon streams is now well known. Thus, selective fractions of the hydrocarbon streams have in the past been adsorbed on the crystalline zeolites. The adsorbents were then treated with a desorbing agent to remove a concentrated stream of adsorbed components and the adsorbed components then sent to a conversion operation. For example, a hydrocarbon fraction containing straight-chain and branched-chain hydrocarbons could be subjected to an adsorption step employing calcium alumino-silicate zeolites as adsorbents. The adsorbents are then desorbed, i.e., the large portion of adsorbed straight-chain hydrocarbons taken from the initial hydrocarbon feed freed from the adsorbent, and the recovered stream of normal paraffins, etc., passed to a hydrocarbon conversion zone such as isomerization.

In addition to their use as highly efficient adsorbents, crystalline alumino-silicate zeolites have recently gained wide acceptance as catalysts for organic conversion reactions and, in particular, hydrocarbon conversion reactions. Among the processes in which these crystalline zeolitic materials are effective catalysts are catalytic cracking, hydrocracking, hydroisomerization, isomerization, reforming, hydroforming, aromatization, alkylation, dealkylation, hydrogenation, disproportionation, hydrodesulfurization, denitrogenation, and the like. These zeolitic materials are characterized by a highly ordered crystalline structure and uniformly-dimensioned pores and are readily distinguishable from each other on the basis of their composition, crystal structure, adsorption properties, and the like. A number of these zeolite materials are described, for example, in U.S. Pat. Nos. 3,013,982–86. For use in hydrocarbon conversion processes it is usually necessary to reduce the initial alkali metal content of the crystalline zeolites by replacing their alkali metal content with other metals or hydrogen containing components which are more conducive to promotion of the desired conversion reaction. Reduction of alkali metal content is readily accomplished by ion-exchange procedures wherein a desired cation is introduced into the zeolitic structure to replace the alkali metal cation initially present. In this manner various degrees and types of catalytic activity can be conferred on the zeolitic materials, depending on the particular cation introduced.

While the use of the above crystalline aluminosilicate zeolite materials as adsorbents and, more recently, as catalysts has been successful in the upgrading of hydrocarbon feed streams, it will be readily appreciated that in certain applications the desired selectivity and product distribution cannot be optimized with the preferred degree of precision, in view of the complex nature of competing reactions normally occurring in typical hydrocarbon conversion processes. It is accordingly an object of the present invention to provide dual or multiple-function catalytic compositions which have the capacity of directing the overall conversion pattern in a desired direction. In one aspect the present invention contemplates the use of a physical mixture of a crystalline alumino-silicate zeolite having a pore size calculated to achieve a desired degree of selectivity and a conventional conversion catalyst capable of effectively achieving the desired degree of conversion in a particular type of conversion reaction. In this embodiment the crystalline zeolite is utilized to selectively convert particular hydrocarbon species contained in the hydrocarbon feed stream without deleteriously affecting the overall conversion pattern. Typical conventional catalysts for the principal conversion desired would include the following: (1) for hydrofining: cobalt molybdate, molybdena or nickel sulfide on alumina support; (2) for hydrocracking: nickel sulfide or platinum group metal on silica-alumina or alumina support; (3) for aromatization: chromia on alumina; (4) for hydroisomerization: platinum or palladium on alumina. Typical hydrogenation catalysts, for example, would include the transition elements and their oxides and sulfides. Representative hydrogenation components include the metals of the platinum group and such metallic oxides as nickel oxide, cobalt molybdate, tungsten oxide, molybdena, chromia, and the like. Sulfides of these metals are also suitable. These hydrogenation components are usually employed on a suitable support, such as alumina, magnesia, silica, and mixtures thereof. Thus the support may or may not have catalytic properties of its own.

In addition to the utilization of crystalline aluminosilicate zeolites in conjunction with conventional hydrocarbon conversion catalysts, it is further contemplated herein that a mixture of two or more different crystalline zeolites can be employed either alone or combined together in a suitable inorganic oxide matrix. In order to better comprehend this particular embodiment, an understanding of the nature of these zeolitic materials will be beneficial. Crystalline alumino-silicate zeolites are characterized by their highly ordered crystalline structure and have pores of nearly uniform dimensions in the range of about 4 to 15 Angstroms. These crystalline molecular sieves have an aluminosilicate anionic cage structure in which the alumina and silica tetrahedra are intimately connected to each other. Metal cations or hydrogen are distributed through the structure to maintain electrical neutrality. The highly ordered dispersion of the silica and alumina tetrahedra makes for a large number of active sites, and the uniform pore openings of 4 to 15 Angstrom units allow for easy ingress of various hydrocarbon feed types, as well as egress of the reaction products which may be formed by contact with the sieves.

The large pore zeolites, i.e., having effective pore diameters of 6 to 15 Angstroms, are preferred when olefins, cyclic or aromatic constituents, or sulfur, oxygen or nitrogen-comprising compounds are to be converted. A naturally occurring example thereof is the mineral faujasite. Synthetically produced alumino-silicates of the faujasite structure are also available, and another large pore zeolite, synthetic mordenite, having an effective pore diameter of about 10 Angstroms, has also recently become available. In addition to these large pore zeolites, crystalline zeolites having uniform pore openings of less than about 6 Angstrom units, e.g., 4 to 5 Angstrom units, are also available and are preferred for conversion processes wherein normal paraffins are to be the feed to the reaction zone.

The chemical formula of the anhydrous crystalline alumino-silicate zeolites, expressed in terms of moles of oxides, may be represented as:

$$0.9 \pm 0.2 \text{ Me}_{2/n}\text{O} : \text{Al}_2\text{O}_3 : X \text{ SiO}_2$$

wherein Me is one or more metal cations, $n$ is its valence, and X is a number from 1 to 14, preferably 2 to 12. In the synthetic form prior to ion exchange, the metal cation is usually an alkali metal such as sodium.

Generally these crystalline zeolites are prepared by having present in the reaction mixture, $Al_2O_3$ as sodium aluminate, alumina sol, and the like; $SiO_2$ as sodium silicate and/or silica gel and/or silica sol; and alkaline hydroxide, either free or in combination with the above components. Careful control is kept over the pH, the alkali metal ion concentration of the mix, as well as the proportions of silica to alumina and alkali to silica, the crystallization period, etc., all in a manner known, per se. A general scheme for preparing large pore crystalline alumino-silicate zeolites would be as follows:

Colloidal silica, such as silica hydrosol, for example, commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180° to 250°F., preferably 200° to 220°F., for a period of 24 to 200 hours or more, preferably 50 to 100 hours, in order to effect crystallization. The crystalline metallic alumino-silicate may then be decanted and washed.

The zeolites which will be most preferred in the present invention will be of the synthetic variety, and particularly will be either of the synthetic faujasite variety, wherein, for example, "X" in the above formula is above about 3, preferably 3 to 6, most preferably 4 to 5.5, and has uniform pore openings in the range of about 6 to 15, preferably 6 to 13, Angstrom units; or of the synthetic 5 Angstrom variety sometimes designated as "Zeolite A" or "Type A" zeolite, the preparation of which is described, for example, in U.S. Pat. Nos. 3,114,603 and 3,058,805. The latter is characterized by uniform pore openings of about 5 Angstroms in diameter and has been utilized for selective conversion reactions such as disclosed in U.S. Pat. No. 3,140,322 based upon its dual capacity to act as a catalyst and also to selectively admit certain sized molecules into contact with its catalytic surfaces while excluding larger molecules.

As hereinbefore mentioned, for use as a catalyst the crystalline alumino-silicate zeolite is customarily base exchanged with a desired cation to replace alkali metal initially present in the zeolite as found naturally or as synthetically prepared. Thus, in the original zeolite, "M" in the above formula is usually an alkali metal, such as sodium, and is replaced by base exchange with a suitable cation or mixture of cations so that the alkali metal oxide content of the zeolite is reduced. The exchange treatment should usually be sufficient to reduce the zeolitic alkali metal content, e.g., sodium and/or potassium content, to less than about 10 wt. % (as $Na_2O$), preferably less than about 3 wt. %, and most preferably to within the range of about 0 to 2 wt. % $Na_2O$. The purpose of the base exchange procedure is to substantially remove alkali metal cations, which have been found to be deleterious to hydrocarbon conversion reactions, as well as to introduce particularly desired catalytic activity by means of the various cations utilized in the exchange medium. For catalytic applications suitable cations for exchanging the zeolite include hydrogen-containing cations, e.g., ammonium ions, and cations of metals in Groups I–B to VIII and rare earth metals, preferably cations of metals in Groups II, III, IV, V, VI–B, VII–B, VIII, and the rare earth metals, and mixtures thereof. More than one cation may be introduced by the use of cation mixtures or by successive exchange treatments. Preferred cations include hydrogen or hydrogen-containing cations, e.g., ammonium ion, and magnesium, cobalt, nickel, zinc, calcium, cadmium, copper, iron, and barium cations. Hydrogen-containing and/or magnesium and/or zinc cations will be particularly preferred. Ion exchange is accomplished by conventional contact of the zeolite with a suitable salt solution of the desired cation, such as the sulfate, chloride, nitrate, etc.

Where the crystalline zeolites are to be employed as catalysts in hydroconversion processes, such as hydrocracking, hydroisomerization, hydrogenation, etc., it will be necessary to employ suitable hydrogenation components supported on the zeolites. Catalytic metals which may be deposited on the above base-exchanged crystalline zeolite can be any of the well known catalytic metals customarily employed in organic conversion processes, particularly hydrocarbon conversion processes. Such metals, for example, will include platinum, palladium, iridium, rhodium, iron, cobalt, nickel, manganese, tungsten, titanium, zirconium, vanadium, hafnium, zinc, cadmium, tin, lead, aluminum, chromium, molybdenum, etc. For hydrocracking reactions it has been found most preferable to impregnate the crystalline zeolite with a platinum group metal, i.e., metals of the platinum and palladium series of the Periodic Table, preferably platinum or palladium, and most preferably palladium. The base-exchanged crystalline zeolite can be composited with a platinum group metal, for example, by treatment with a solution of a platinum group metal salt or ammonium complex, e.g. ammonium chloroplatinate, ammoniacal palladium chloride, etc., to thereby incorporate a catalytic amount of the metal. Following such incorporation the catalyst can be subjected to a reducing step by treatment in a hydrogen atmosphere to thereby reduce the metal to its elemental form in a fine uniform dispersion.

The use of a mixture of zeolites, preferably having substantially different pore size, has been found to be highly effective in achieving a desired degree of selectivity and product distribution and/or an incremental increase in the upgrading potential of a particular conversion process. For example, the use of the above large pore, e.g. 10 to 13 Angstroms, crystalline zeolite for hydrocracking and catalytic cracking purposes is now well known. U.S. Pat. Nos. 2,971,903 and 2,971,904 describe the use of these zeolitic materials in various conversion processes. Furthermore, U.S. Pat. No. 3,140,249 describes the use of these zeolitic materials distributed throughout an inorganic oxide matrix for such purposes as catalytic cracking. The essence of the present invention which distinguishes over these and other prior art teachings resides in the use of at least two different types of zeolites, preferably having substantially different pore size, wherein the pore sizes selected are designed to achieve a desired selectivity in the direction of the overall reaction pattern. Whereas the crystalline alumino-silicate zeolite type of conversion catalyst is markedly superior to prior conventional amorphous type catalysts, there remains the need for further improvement in terms of product yield, distribution and selectivity.

While the new zeolitic catalysts usually produce substantially higher gasoline yields, the octane number of such gasoline products is not appreciably different than that produced by the conventional cracking catalysts, such as synthetic silica-alumina. In one embodiment of the invention, inclusion in the overall catalyst composition of a relatively small pore size crystalline zeolite produces a gasoline product having considerably improved octane number. In another embodiment, the utilization of a relatively small pore size zeolite with a relatively large pore size zeolite results in a dual crystalline functionality, which in turn produces both improved product yield over conventional catalysts and improved product quality derived from the selective nature of the relatively small pore size zeolite.

Thus, in one preferred embodiment of the invention, a relatively large pore size crystalline zeolite is used together with a relatively small pore size crystalline zeolite. By "relatively large pore size" is meant a pore size of about 6 to 15 Angstroms. By "relatively small pore size" is meant a pore size of less than about 6, preferably about 5, Angstrom units. The relatively large pore size zeolites have been described above. Relatively small pore size zeolites having uniform pore openings of less than 6, preferably 5, Angstroms are also well known and available in synthetic or natural form. For example, a suitable starting material, referred to as "Zeolite A" in U.S. Pat. No. 2,882,243, has a molar formula (dehydrated form) of

$$1.0 \pm 0.2\ M_{2/n}O : Al_2O_3 : 1.85 + 0.5\ SiO_2$$

where M is a metal usually sodium and n is its valence. It may be prepared by heating a mixture containing $Na_2O$, $Al_2O_3$, $SiO_2$, and $H_2O$ (supplied by suitable source materials) at a temperature of about 100°C. for 15 minutes to 90 hours or longer. Suitable ratios of these reactants are fully described in the aforementioned patent. The product produced by conventional procedure will have uniform pore openings of about 4 Angstroms as produced in the sodium form. They may then be converted to products having uniform pore openings of about 5 Angstroms by replacement of the sodium via conventional ion-exchange techniques with various cations, such as calcium, magnesium, cobalt, nickel, iron, manganese, etc. Natural zeolites having effective pore diameters less than 6 Angstroms, and preferably about 5 Angstroms, are also herein contemplated for use as the relatively small pore size zeolite and are represented by such materials as erionite, chabazite, clinoptilolite, etc. Thus both the natural and synthetic varieties of 5-Angstrom zeolites are contemplated with the only limitation being one of pore size. It will be preferred in some applications, such as hydrocracking for the improvement of naphtha octane number, that the relatively small pore size be sufficient to substantially admit straight-chain hydrocarbon molecules but insufficient to admit valuable high octane-producing components such as aromatics. This capacity should be demonstrated at the particular operating conditions employed, since the effective pore diameter of these zeolitic materials often varies with temperature and pressure.

When the mixture of crystalline zeolites of at least two substantially different pore sizes is employed in hydro techniques, such as hydrocracking, hydroisomerization, hydrodesulfurization, hydrodenitrogenation, hydrogenation, etc., it is not necessary that both zeolites contain an added hydrogenation component. While the hydrogenation component can be deposited on the overall catalytic composition, it is also contemplated that each zeolitic component can be separately combined with the hydrogenation metal or that only one of the zeolite components be so combined. The preferred hydrogenation component in either case will be a platinum group metal, such as palladium. Platinum group metals are readily impregnated into the zeolitic materials by treatment with an aqueous ammonium complex solution, such as an ammoniacal solution of palladium chloride. Preferred amounts of platinum group metal will fall in the range of about 0.1 to 6, e.g. 0.5 to 3, wt. percent based on each dry zeolite component.

Another embodiment of the present invention contemplates that the admixture of at least two substantially differing pore size zeolites be incorporated into an inorganic oxide matrix. In this way the zeolitic crystals are suspended in and distributed throughout the inorganic oxide matrix. Such a catalyst is characterized by a high resistance to attrition, high activity and exceptional selectivity and steam stability. It can be readily prepared, for example, by dispersing the two or more types of zeolite crystals in a suitable siliceous sol and gelling the sol by various means. The inorganic oxide which serves as the "matrix" in which the above crystalline zeolites are uniformly distributed, i.e. "encapsulated," include silica gel per se, or more preferably a cogel of silica, and an oxide of at least one metal selected from the group consisting of metals of Groups II-A, III-A and IV-B of the Periodic Table; as set forth in pages 394 and 395 of the *Handbook of Chemistry and Physics*, 38th Edition (1956–57). The terms "gel" and "cogel" as used herein are intended to include gelatinous precipitates, hydrosols, hydrogels, etc. Suitable cogels include, for example, silica-alumina, silica-magnesia, silica-zirconia, silica-thoria, silica-beryllia, silica-titania, as well as ternary combinations such as silica-alumina-zirconia, silica-alumina-magnesia, silica-magnesia, zirconia, etc. Preferred cogels will include silica-alumina, silica-alumina-zirconia, and silica-magnesia, with silica-alumina being particularly preferred. These gels and cogels will generally comprise a major proportion of silica and a minor proportion of the other aforementioned oxide or oxides. Thus the silica content of the siliceous gel or cogel matrix will generally fall within the range of 55 to 100 wt. %, preferably 60 to 90 wt. %, and the other metal oxide or oxides content will generally fall within the range of 0 to 45 wt. %, preferably 10 to 40 wt. %. For the particularly preferred silica-alumina matrix, the alumina content will preferably be about 8 to 40 wt. %, preferably 12 to 30 wt. %. Siliceous hydrogels utilized herein, e.g. silica-alumina hydrogel or gelatinous co-precipitate, can be produced by any of a number of known methods. They may be used as commercially supplied or may be separately prepared. For example, siliceous hydrogels can be prepared by hydrolysis of ethylorthosilicate, acidification of an alkali metal silicate containing a compound of the metal desired in the ultimate cogel, etc. Thus a suitable silica-alumina hydrogel can be produced by preparing a hydrous precipitate of silica by mixing a solution of sodium silicate with an acid, e.g. sulfuric acid, to produce a slurry having pH below 7, usually below about 4; then adding a solution of an aluminum salt, e.g. aluminum sulfate; and adjusting the pH of the mixture to above about 4 by addition of alkaline material, e.g. ammonia, in order to precipitate alumina.

In addition to the above it is contemplated that the "matrix" can also comprise natural or synthetic clays, such as kaolin type clays, montmorillonite, bentonite, halloysite, etc.

The zeolite-matrix compositions are prepared by intimately admixing the aforedescribed crystalline alumino-silicate zeolites with the siliceous hydrogel, clay or mixtures thereof, and thereafter obtaining a composite product comprising the zeolitic components uniformly distributed throughout and suspended in an inorganic oxide matrix.

The formation of the encapsulated zeolite catalysts can be achieved by various means. For example, alumino-silicate zeolite crystals can be dispersed in siliceous hydrosol or in one of the reactants used in forming the hydrosol where the hydrosol is characterized by a short gelation time. This procedure is described in U.S. Pat. No. 3,140,249 which specifies the weight mean particle diameter of the alumino-silicate required to produce the desired strength and diffusivity of the product. The siliceous hydrosol containing the zeolite crystals is then allowed to set after a suitable period of time forming the zeolite-gel matrix product, and the gelled product can thereafter be dried and broken into pieces of desired size. Alternatively, the gel may be extruded or pelleted to obtain uniformly shaped pieces. Also, the hydrosol can be introduced into perforations of a perforated plate, retained therein until the sol sets to a hydrogel, followed by removal of the hydrogel pieces from the plate. Further, spheroidal particles can be obtained by methods as described, for example, in U.S. Pat. No. 2,384,946. These methods involve introducing globules of hydrosol into a column of water-immiscible liquid, e.g. an oil medium. The globules of hydrosol set to a hydrogel and subsequently pass into a bottom water layer from which they are recovered. The use of spherically shaped particles is of particular advantage in moving bed and fluidized bed hydrocarbon conversion processes.

While the matrix type compositions of the invention can be prepared by any of the above methods, it will be particularly preferred to subject the mixture of crystalline zeolite and siliceous hydrogel, after suitable homogenization (e.g. by passage through a colloid mill to produce a fine dispersion) to a rapid evaporation technique, such as spray drying, flash drying, etc. The spray drying step comprises spraying the composite mixture through nozzles into a tower containing hot flowing gases at a temperature at the nozzles in the range of about 400° to 650°F. This procedure is desirable because of increased attrition resistance achieved due to the spherical nature of the particles obtained, as well as the excellent particle size distribution useful in fluidized bed processes, e.g. predominantly 20 to 80 micron average particle diameter. A highly porous solid is thus obtained having improved attrition resistance.

As mentioned, the mixture of two or more differing pore size zeolites can be employed per se or combined in a suitable inorganic oxide matrix. Where a matrix is utilized the total amount of crystalline zeolite (of the two or more types) will generally be in the range of about 1 to 30 wt. %, preferably 2 to 20 wt. %, most preferably about 3 to 10 wt. %, based on the total catalytic composition. In the encapsulated form contemplated herein, the aforedescribed base exchange of the zeolites to replace their initial alkali metal content and impregnation with hydrogenation metal component can be accomplished either prior or subsequent to incorporation of the zeolites into the matrix.

Where the mixture of zeolites is used without a supporting matrix, the two or more zeolites are preferably ground or milled together and then granulated or pelleted for use. Alternatively, the two zeolites may be separately pelleted or granulated followed by mixing of the pellets or granules. With or without the matrix component, the ratio of the relatively large pore zeolite to the relatively small pore zeolite will generally be within the range of from about 0.05:1 to 9.5:1, preferably 0.1:1 to 9:1.

Another embodiment of the invention resides in the use of the crystalline zeolite in conjunction with conventional hydrocarbon conversion catalyst. In this embodiment the zeolite can be used either for its inherent catalytic properties or its inherent adsorption properties or both. Thus, for example, the adsorption properties of a relatively small pore size zeolite can be utilized in conjunction with a conventional amorphous cracking or hydrocracking catalyst to first adsorb a selected portion of the hydrocarbon feed prior to subsequent conversion of such adsorbed portion, or its catalytic properties can be use directly to selectively convert such selected portion while the remaining portions are converted by the conventional catalyst. In the first illustration, a hydrocarbon feed stream is contacted under adsorption conditions with a mixture of catalysts suitable for the desired conversion and crystalline alumino-silicate zeolites having an affinity for the material which it is desired to ultimately convert. The mixture of adsorbed hydrocarbon constituents, crystalline alumino-silicate zeolites and hydrocarbon conversion catalyst is then passed to a conversion zone wherein the adsorbed components are converted under reaction conditions. In this embodiment the zeolite will generally comprise 10 to 90, preferably 40 to 80, wt. % of the mixture of catalysts and zeolite, with about 50 to 500, preferably 100 to 200, wt. % of catalyst per barrel of adsorbed constituents being employed. Adsorption conditions range from 300° to 600°F. and 0 to 1,500 psig and reaction conditions from 500° to 1,100°F. and 0 to 1,500 psig. To further characterize this embodiment, a hydrocarbon feed stream can be contacted with a mixture of crystalline alumino-silicate zeolite adsorbents and conventional hydrocarbon conversion catalysts so as to adsorb less than about 50 percent of the feed constituents, i.e. those most desired for conversion. Thereafter, the adsorbed components, zeolite and conversion catalysts are passed to a hydrocarbon conversion zone wherein only this minor quantity of hydrocarbon feed constituents is subjected to conversion. The resulting reaction products are separated from the mixture of zeolites and hydrocarbon conversion catalysts with the latter still in admixture being recycled for further adsorption. In general, the products of the hydrocarbon conversion are most conveniently recovered by passing the total effluent of the reaction zone to a portion of the adsorption zone, or an allied vessel, wherein the mixture is contacted with fresh feed. As new materials are adsorbed on the crystalline alumino-silicate zeolite adsorbent, the reaction products are desorbed and may be recovered overhead. This means can thus be used to overcome the limitations imposed by chemical equilibrium, and further is particularly suited to handling complex feed mixtures such as a sour naphtha feed or an unstable heating oil fraction, wherein only a small fraction, e.g. 5 to 10 percent, of the mixture needs be subject to conversion, or is amenable to conversion. To further illustrate this embodiment in the hydrocracking of hydrocarbon constituents, the following is a representative example:

A middle distillate hydrocarbon stream, boiling in the range of 350° to 500°F., is passed to an adsorption zone operating at 550°F. and 1,500 psig wherein 15 percent of the initial feed constituents are adsorbed. The zeolites are calcium alumino-silicate materials having silica-to-alumina ratios of about 5.2. The hydrocracking catalyst is a 6 percent nickel sulfide catalyst on a silica-alumina base and comprises 25 vol. % of the admixture of molecular sieve zeolite and catalyst and is employed in an amount of about 150 wt. % of feed constituents adsorbed. The combined admixture containing adsorbed components is then passed to a hydrocracking reaction stage operating at a temperature of 650°F. and a pressure of 1,500 psig with about 15,000 SCF of hydrogen being added per barrel of feed constituents adsorbed on the zeolites. The resulting hydrocracked materials can be withdrawn overhead via a distinct desorption step and if desired combined with the unconverted hydrocarbon constituents not initially adsorbed on the zeolite adsorbents. Alternatively, the reaction effluent may be sent in total to the adsorption zone wherein products are desorbed by the feed. Product distribution of the fraction not subjected to adsorption and the product recovered directly from the hydrocracking stage (assuming it wasn't combined with the nonconverted feed stream) is set forth below.

|  | Boiling Range, °F. | Vol. % of Initial Feed |
|---|---|---|
| Unadsorbed Fraction | 350–550 | 85 |
| Hydrocracked Fraction | 350+ | 4.5 |
|  | C₅–350 | 11.4 |
|  | C₄ | 1.4 |
|  | C₃⁻ | 0.4 wt. % |

The unadsorbed fraction and the 350°F.+ boiling hydrocracked fraction comprise a high luminosity jet fuel. The C₅–350°F. boiling fraction comprises a premium quality gasoline blending stock.

As a further illustration, the present invention may be employed to advantage in a process for the isomerization of the normal paraffins in naphtha fractions. It has been found that a catalyst comprising about 0.5 wt. % of palladium on the hydrogen form of a relatively large pore size, e.g. 13 Angstroms, crystalline zeolite (having a high silica-to-alumina ratio, i.e. synthetic faujasite) has excellent activity for the isomerization of normal $C_5$ and $C_6$ paraffins. Thus, a $C_5/C_6$ naphtha from Arabian crude comprising about 18% normal pentane, 35% normal hexane and about 8% cyclohexane and methylcyclopentane is passed to a zone operating at 550°F. and a pressure of 600 psig. The zone contains a mixture of 75 percent of a calcium-alumino-silicate 5-Angstrom crystalline zeolite which is capable of selectively adsorbing normal paraffins, and 25 percent of a 0.5 wt. % palladium-on-hydrogen form 13-Angstrom crystalline zeolite having a silica-to-alumina ratio above 3, e.g. 4 to 5.5. The combined mixture containing adsorbed normal paraffins is subjected to hydroisomerization conditions including a temperature of 675°F. and 600 psig with about 4,000 SCF of hydrogen being added per barrel of adsorbed normal paraffins. Under these conditions the normal paraffins are isomerized to a near equilibrium mixture comprising about 65 percent isopentane based on total pentane and 78 percent isohexane based on total hexane.

The present invention is thus concerned with a physical mixture of catalysts of different types wherein at least one component is a crystalline alumino-silicate material, as described above. The advantages attainable by the present invention reside in the selective nature of the catalytic compositions employed herein. One particular application resides in the ability of the catalytic compositions of the invention to achieve about the same degree of conversion as prior compositions, while at the same time imparting a desired degree of selectivity to the overall conversion pattern. For example, the use of the relatively small pore size crystalline zeolite is responsible for a selective conversion of normal paraffinic components contained in the hydrocarbon feed without affecting hydrocarbons incapable of gaining entry into the relatively small pores, such as isoparaffinic and aromatic constituents. It is in this manner that the present invention can be utilized to overcome the limitations imposed by chemical equilibrium.

The operating conditions to be employed in the practice of the present invention will, of course, vary with the particular conversion reaction desired. The following table summarizes typical reaction conditions effective in the present invention.

| Principal conversion desired | Reaction conditions | | | |
|---|---|---|---|---|
|  | Temp., °F. | Pressure, psig | Feed rate, V/V/hour | Hydrogen rate, SCF/bbl. |
| Hydrofining | 500–850 | 200–2000 | 0.1–10.0 | 500–10,000 |
| Hydrocracking | 450–850 | 200–2000 | 0.1–10.0 | 500–10,000 |
| Aromatization | 800–1100 | 0–50 | 0.1–10.0 | 0–10,000 |
| Hydroisomerization | 300–700 | 100–1000 | 0.5–20.0 | 500–10,000 |
| Catalytic cracking | 700–1000 | 0–50 | 0.1–20.0 | 0 |
| Hydrodealkylation | 700–1200 | 50–1000 | 0.5–20.0 | 500–10,000 |
| Catalytic reforming | 850–1000 | 50–1000 | 0.1–20.0 | 500–10,000 |

The feedstock suitable for conversion in accordance with the invention includes any of the well-known feeds conventionally employed in hydrocarbon conversion processes. Usually they will be petroleum derived, although other sources such as shale oil are not to be excluded. Typical of such feeds are included heavy and light virgin gas oils, solvent extracted gas oils, coker gas oils, steam-cracked gas oils, middle distillates, steam-cracked naphthas, coker naphthas, catalytically-cracked naphthas, cycle oils, deasphalted residua, etc.

The invention will be further understood from the following examples, which are not intended to be limiting.

EXAMPLE 1

In order to demonstrate the improved hydrocracking activity and selectivity of the dual-function catalyst mixtures of the invention, a light raw catalytic cycle stock, boiling in the range of about 400° to 650°F. and having a gravity of 31° API and a nitrogen content of 40 ppm, was hydrocracked in two different operations. In the first operation the feed was hydrocracked in fixed bed downflow manner at a feed rate of 1.0 V/V/hour, a temperature of 667°F., a pressure of 1,000 psig with a hydrogen rate of 4,000 SCF/barrel of feed. The catalyst used in the first operation was a relatively large pore size crystalline alumino-silicate zeolite having a faujasite structure which had been exchanged with both hydrogen-containing cations and magnesium cations and had been further impregnated with 0.5 wt. % palladium. More particularly, this catalyst had a silica-to-alumina mole ratio of about 4.9 and uniform pore openings of about 13 Angstroms and had been prepared from an aqueous reaction mixture containing silica, alumina and soda source materials. After crystallization of the faujasite product by known procedures and separation of the product from its mother liquor, followed by thorough washing, the faujasite product was then successively converted to the ammonium form and then partially to the magnesium form by conventional ion-exchange procedures. The first ion-exchange step utilized ammonium hydroxide and ammonium chloride solutions to replace about 90 percent of the initial sodium content of the faujasite with ammonium ion. Subsequent to the ammonium ion exchange, the product was treated with magnesium sulfate solution to produce a product containing about 3 wt. % magnesium. The ammonium-magnesium product was then impregnated with palladium by slurrying the product in water and adding a sufficient quantity of ammoniacal palladium chloride solution to produce about 0.5 wt. % palladium in the final product. The catalyst was then washed, dried, pilled and finally calcined in air at elevated temperature, e.g. 1,000°F. The product obtained was the hydrogen-magnesium form of synthetic faujasite-type crystalline zeolite impregnated with palladium, the hydrogen form being produced by liberation of ammonia during the calcination step.

The results obtained with the hydrogen-magnesium faujasite catalyst at the above conditions were as follows:

TABLE I

Hydrocracking with Large Pore Crystalline Zeolite; 667°F.; 1.0 V/V/Hour; 1000 psig; 4000 SCF/bbl.

| Product Yields: | | Product Inspections on $C_5$–430°F. Fraction: | |
|---|---|---|---|
| $C_5$–430°F., Vol. % | 25.0 | Gravity, ° API | 53.2 |
| Butanes, Vol. % | 8.0 | Research Octane, Clear | 68.0 |
| $C_3$–, Wt. % | 1.3 | Research Octane + 3 cc TEL | 86.9 |
| | | Motor Octane + 3 cc TEL | 84.5 |

The above results are compared below to an operation involving the hydrocracking of the same catalytic cycle stock utilized above with a catalyst mixture of the invention. This catalyst mixture comprised one part of the above hydrogen-magnesium faujasite and 6 parts of a relatively small pore size crystalline zeolite material. The relatively small pore size zeolite catalyst was prepared from synthetic erionite, which is believed to have elliptical uniform pore openings of about 5.5 Angstroms. The synthetic erionite had been prepared from an aqueous reaction mixture containing silica, alumina, soda, and potassium hydroxide source materials. After crystallization of the erionite product by known procedures, it was separated from its mother liquor and thoroughly washed with water. The erionite product contained 9.3 wt. % potassium ions, 2.3 wt. % sodium ions, and had a silica-to-alumina mole ratio of about 7.3.

A sample of this material was ion exchanged with a hydrogen-containing cation solution. More particularly, an aqueous solution of ammonium chloride was employed to replace most of the potassium and sodium ions. The ion exchange was conducted by conventional procedures; and after washing and drying of the exchanged product, 0.5 wt. % palladium was incorporated into the catalyst by treatment with a palladous ammonium chloride solution. After filtering, washing and drying and calcination at about 1,000°F., the catalyst analyzed 0.5 wt. % palladium and 3.2 wt. % potassium ions, 0.06 wt. % sodium ions, and had a silica-to-alumina mole ratio of about 7.3. The catalyst was then pelletized and mixed with the relatively large pore size catalyst described above, whereafter the catalyst mixture was charged to a fixed bed hydrocracking unit operating at a temperature of 750°F., a pressure of 1,000 psig, a feed rate of 3.0 V/V/hour, with a hydrogen rate of 4,000 SCF/barrel of feed. The following results were obtained.

TABLE II

Hydrocracking with Catalyst Mixture of Large and Small Pore Crystalline Zeolite 750°F.; 3.0 V/V/Hour; 1000 psig; 4000 SCF/bbl.

| Product Yields: | | Product Inspections on $C_5$–430°F. Fraction: | |
|---|---|---|---|
| $C_5$–430°F., Vol. % | 23.9 | Gravity, ° API | 44.6 |
| Butanes, Vol. % | 5.0 | Research Octane, Clear | 92.7 |
| $C_3$–, Wt. % | 9.6 | Research Octane + 3 cc TEL | 99.5 |

As indicated in Tables I and II above, a substantial increase in octane number of the valuable $C_5$-430°F. gasoline fraction was obtained through the use of the mixed catalyst system as compared to that obtained with the large pore zeolite catalyst alone. Only a slight decrease in gasoline yield was obtained, which was substantially offset by the significant octane increase.

EXAMPLE 2

The feedstock utilized in Example 1 was initially hydrofined over a conventional cobalt molybdate-alumina catalyst to thereby reduce its nitrogen content from 40 ppm to about 1 ppm. The hydrofined product having an API gravity of 33° was then hydrocracked over the catalyst mixture described in Example 1, namely, one part of the relatively large pore 0.5 wt. % palladium-on-magnesium hydrogen faujasite to 6 parts of the 0.5 wt. % palladium-on-hydrogen erionite. Hydrocracking conditions in this instance included a feed rate of 5.5 V/V/hour, a pressure of 1,000 psig and a hydrogen rate of 4,000 SCF/barrel of feed. Two different temperatures were employed, 700°F. and 750°F., with the following results being obtained:

TABLE III

Hydrocracking with Catalyst Mixture of Large and Small Pore Crystalline Zeolite; 5.5 V/V/Hour; 1000 psig; 4000 SCF/bbl.

| Temperature, °F. | 700 | 750 |
|---|---|---|
| Product Yields: | | |
| $C_5$–430°F., Vol. % | 23.0 | 27.5 |
| Butanes, Vol. % | 5.4 | 6.4 |
| $C_3$–, Wt. % | 6.3 | 9.1 |
| Product Inspections on $C_5$–430°F. Fraction: | | |
| Gravity, ° API | 45.6 | 47.0 |
| Research Octane, Clear | 85.7 | 89.0 |
| Research Octane + 3 cc TEL | 96.2 | 98.3 |
| Motor Octane + 3 cc TEL | — | 90.3 |

Again a superior octane number of the $C_5$–430°F. gasoline fraction was produced by hydrocracking operation with the mixed catalyst system of the invention.

EXAMPLE 3

To further demonstrate the present invention, several catalytic cracking catalysts were produced by the aforedescribed encapsulation technique which involved the suspension of crystalline zeolite material in an amorphous inorganic oxide matrix. The catalysts were generally prepared by adding the zeolite crystals in the desired proportion to a silica-alumina hydrogel containing about 13 percent alumina followed by drying the mixture at about 250°F. The silica-alumina hydrogel was obtained from a commercial supplier and is believed to have been made by the addition of sulfuric acid to a sodium silicate solution to produce a slurry of precipitated hydrous silica having a pH of about 4. To this is added a solution of aluminum sulfate sufficient to yield a final product of 13 percent alumina and 87 percent silica. The pH of the mixture is raised to about 6 by the addition of a 28 percent solution of ammonia; and the hydrous precipitate is washed on rotary filters, first at a pH of about 6.5 and finally at a pH of about 7.5. The hydrous precipitate of silica-alumina was slurried in about twice its weight of water, and the desired quantity of the crystalline zeolite or zeolites was then added and the mixture was passed through a colloid mill prior to the drying step at 250°F.

The various catalysts of this example were prepared as follows:

Catalyst "A" was prepared by addition of 10 parts of a sample of hydrogen-mordenite to 90 parts of the silica-alumina hydrogel. The hydrogen-mordenite sample was obtained from the Norton Company and was of the synthetic variety having a silica-to-alumina mole ratio of about 10 and uniform pore openings believed to be about 8 Angstroms in diameter. The sodium content of this mordenite sample had been reduced by hydrogen-cation exchange to about 0.5 wt. %.

Catalyst "B" was prepared by incorporating 33 parts of the above hydrogen-mordenite material to 67 parts of the silica-alumina hydrogel.

Catalyst "C" was prepared by the addition of 5 parts of a hydrogen-faujasite sample to 95 parts of silica-alumina hydrogel. The hydrogen-faujasite sample was prepared in substantial accordance with the procedure described in Example 1, except that the magnesium-cation exchange step was eliminated.

Catalyst "D" was prepared by the addition of 5 parts of the above-described hydrogen-mordenite plus 5 parts of the above-described hydrogen-faujasite to 90 parts of the silica-alumina hydrogel and represents a catalyst of the invention.

Catalyst "E" was prepared by the addition of 5 parts of the hydrogen-erionite material described in Example 1 plus 5 parts of the hydrogen-faujasite sample described above to 90 parts of the silica-alumina hydrogel and represents a catalyst of the invention.

Catalyst "F" was prepared by addition of 5 parts of magnesium-faujasite plus 5 parts of a magnesium-synthetic 5-Angstrom zeolite (Zeolite "A") to 90 parts of the silica-alumina hydrogel and represents a catalyst of the invention. The magnesium-faujasite sample was prepared in substantial accordance with the procedures described in Example 1, except that the hydrogen-cation exchange step was eliminated. The magnesium-synthetic 5-Angstrom zeolite sample was prepared from a sample of commercial calcium Zeolite "A" having pore openings of about 5 Angstroms in diameter and a silica-to-alumina mole ratio of about 2.1. A sample of this material was subjected to magnesium-cation exchange by treatment with a solution of magnesium sulfate. The ion exchange was conducted at about 160°F. and repeated twice. The final product analyzed about 5.3 wt. % magnesium and 6.0 wt. % sodium.

Catalyst "G" was a commercially available silica-alumina amorphous cracking catalyst containing 25 percent alumina supplied by the W. R. Grace Company.

The above-described catalysts were divided into two portions. One portion of each catalyst was subjected to a calcination treatment at 1,000°F. in the presence of air, and another portion was separately treated with steam at atmospheric pressure and 1,400°F. for 16 hours. The thus-treated catalysts were then employed in a catalytic cracking operation of an East Texas Gas Oil feed having a boiling range of about 500° to 700°F. The conversion conditions employed included a temperature of 950°F. and a cycle time of 2 minutes at atmospheric pressure, with the feed rate being adjusted to produce a conversion level of 60 percent. The results of these cracking tests are summarized in the following Tables IV and V.

TABLE IV

Catalytic Cracking of East Texas Gas Oil; 950°F.; Atm. Pressure; 2-Minute Cycle; 60% Conversion Catalysts Calcined at 1000°F.

| | Catalysts | | | | |
|---|---|---|---|---|---|
| | A | B | D* | E* | G |
| Feed Rate, W/Hour/W | 8.9 | 12.6 | 13.4 | 5.5 | 7.5 |
| Yields, Wt. % | | | | | |
| Carbon | 3.6 | 3.6 | 2.9 | 6.9 | 4.2 |
| $C_3$– | 11.8 | 12.6 | 8.9 | 10.4 | 13.2 |
| $C_4$ | 15.0 | 15.0 | 12.6 | 12.5 | 15.6 |
| $C_5$–430°F. | 29.6 | 28.8 | 35.6 | 30.2 | 27.0 |

* Catalysts of the invention.

TABLE V

Catalytic Cracking of East Texas Gas Oil; 950 °F.; Atm. Pressure; 2-Minute Cycle; 60% Conversion Catalysts Steamed 16 Hours at 1400 °F. and 0 psig

| | Catalysts | | | | | | |
|---|---|---|---|---|---|---|---|
| | A | B | C | D* | E* | F* | G |
| Feed rate, W/hour/W | 1.2 | 0.9 | 3.4 | 4.7 | 3.6 | 4.3 | 1.8 |
| Yields, wt. percent: | | | | | | | |
| Carbon | 6.5 | 6.0 | 1.1 | 1.2 | 1.1 | 1.1 | 4.4 |
| $C_3^-$ | 13.2 | 11.8 | 9.0 | 7.9 | 7.5 | 6.1 | 11.9 |
| $C_4$ | 11.9 | 13.6 | 12.2 | 10.7 | 10.7 | 9.6 | 14.0 |
| $C_5$–430 °F. | 28.4 | 28.6 | 37.7 | 40.2 | 40.7 | 43.2 | 29.7 |

*Catalysts of the invention.

As clearly shown in the above Tables IV and V, the results of the cracking tests with the East Texas Gas Oil feed utilizing the catalysts of the invention (Catalysts "D," "E," and "F") are markedly superior to those obtained with the comparison Catalysts "A," "B," "C," and "G." In particular, the substantially higher gasoline yields obtained with the mixed crystalline zeolite catalysts, particularly after steam treatment, is clearly evident.

EXAMPLE 4

To further demonstrate the present invention, several hydroisomerization catalysts comprising 0.5 wt. % palladium on the hydrogen forms of mixed zeolites were prepared. The catalysts were generally prepared by separately treating the hydrogen or ammonium form of the zeolites with sufficient ammoniacal palladium chloride solution to deposit thereon 0.5 wt. % palladium. After drying the impregnated zeolites were formed into 3/16 inch × 3/16 inch cylindrical pellets and the pellets were then crushed to give granules of 10 to 60 mesh size. Finally the separately produced granules were mixed in equal proportions to give the finished catalyst. In each case the mixed catalyst was calcined in dry air at 1,000°F. to remove final traces of water and to decompose ammonium ions, leaving the hydrogen form of the zeolites. The zeolites used were those described in Example 3.

Catalyst "H" contained 1 part of 0.5 wt. % palladium deposited on hydrogen-erionite plus 1 part of 0.5 wt. % palladium deposited on hydrogen-faujasite.

Catalyst "I" contained 1 part by weight of 0.5 wt. % palladium on hydrogen-mordenite plus 1 part by weight of 0.5 wt. % palladium on hydrogen-faujasite.

After calcination at 1,000°F. Catalysts "H" and "I" were employed for the hydroisomerization of normal hexane, feeding 8 volumes of normal hexane per volume of catalyst per hour, with 4,000 standard cubic feet of hydrogen per barrel of feed at a pressure of 450 psig and at a temperature of 600°F. The results of these operations are given in Table VI.

TABLE VI

Hydroisomerization of Normal Hexane; 600°F.; 8 V/V/Hour; 450 psig; 4000 SCF $H_2$/bbl. Catalysts Calcined at 1000°F.

| | Catalysts | |
|---|---|---|
| | H | I |
| Conversion, Wt. % | 37.2 | 49.1 |
| Yield of Isohexanes | 35.0 | 47.8 |
| Yield of $C_5^-$ | 2.2 | 1.3 |

It is clearly apparent from the results shown in Table VI that the mixed zeolite catalysts are active and selective for the hydroisomerization of normal hexane.

As indicated by the previous examples, substantial benefits are derived from the utilization of a mixed crystalline zeolite catalyst system, wherein the conversion abilities of a relatively large pore size zeolite and a relatively small pore size zeolite are combined and complement each other to achieve a desired result, such as improved product selectivity. While the above examples are directed to but three conversion processes, namely, hydrocracking, catalytic cracking, and hydroisomerization, it is to be understood that the inventive concept described herein is not to be so limited but has broad application commensurate with the disclosure hereinbefore set forth. Further, the invention is not to be construed as limited in any way, except as defined in the appended claims.

What is claimed is:

1. A process for converting a hydrocarbon material which comprises subjecting said hydrocarbon material to conversion conditions in a zone containing at least two crystalline alumino-silicate zeolites, one of said two zeolites having a pore size within the range of about 6 to 15 Angstroms and the other of said two zeolites having a pore size of less than about 6 Angstroms, and additionally wherein hydrogen is fed to said zone and wherein said zone additionally contains a hydrogenation component associated with at least one of said zeolites.

2. The process of claim 1, wherein the ratio of said zeolite having a pore size within the range of about 6 to 15 Angstroms to said zeolite having a pore size less than 6 Angstroms is within the range of from about 0.05:1 to 9.5:1.

* * * * *